United States Patent
Muthiah

(10) Patent No.: US 12,363,312 B2
(45) Date of Patent: Jul. 15, 2025

(54) STORAGE SYSTEM AND METHOD FOR STORAGE MANAGEMENT IN MULTI-CHANNEL, VARIABLE-BIT-RATE SYSTEMS

(71) Applicant: Western Digital Technologies, Inc., San Jose, CA (US)

(72) Inventor: Ramanathan Muthiah, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 229 days.

(21) Appl. No.: 17/176,831

(22) Filed: Feb. 16, 2021

(65) Prior Publication Data
US 2022/0086455 A1    Mar. 17, 2022

Related U.S. Application Data

(60) Provisional application No. 63/077,004, filed on Sep. 11, 2020.

(51) Int. Cl.
*H04N 19/15* (2014.01)
*G06F 3/06* (2006.01)

(52) U.S. Cl.
CPC .......... *H04N 19/15* (2014.11); *G06F 3/0611* (2013.01); *G06F 3/064* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 6,925,120 B2 | 8/2005 | Zhang et al. | |
| 7,054,371 B2 | 5/2006 | Kim | |
| 7,492,731 B2 | 2/2009 | Hagendorf | |
| 8,649,425 B2* | 2/2014 | Seo | H04N 5/765 375/240.01 |
| 2007/0067598 A1* | 3/2007 | Fujimoto | G06F 3/0634 711/170 |
| 2007/0183198 A1* | 8/2007 | Otsuka | G06F 3/0661 711/E12.1 |

(Continued)

OTHER PUBLICATIONS

International Search Report mailed Sep. 19, 2021 for International Application No. PCT/US2021/033857.

(Continued)

*Primary Examiner* — Stuart D Bennett
(74) *Attorney, Agent, or Firm* — Crowell & Moring LLP

(57) ABSTRACT

A storage system and method for storage management in multi-channel, variable-bit-rate systems are provided. In one embodiment, a host is provided comprising a first interface configured for communication with a storage system; a second interface configured for communication with a video capture device; and a processor. The processor is configured to receive an internal latency estimate from the storage system; use the internal latency estimate from the storage system to determine whether a rate of data generation by the video capture device exceeds a storage rate of the storage system; and in response to determining that the rate of data generation by the video capture device exceeds the storage rate of the storage system, instruct the video capture device to lower its rate of data generation. Other embodiments are provided.

20 Claims, 6 Drawing Sheets

(56) References Cited

U.S. PATENT DOCUMENTS

| | | | |
|---|---|---|---|
| 2014/0068007 A1* | 3/2014 | O'Gorman | H04N 7/147 |
| | | | 709/219 |
| 2016/0080744 A1 | 3/2016 | Brydon et al. | |
| 2016/0188208 A1* | 6/2016 | Kim | G06F 3/0652 |
| | | | 711/103 |
| 2016/0283119 A1* | 9/2016 | Frickey, III | G06F 3/061 |
| 2017/0371558 A1* | 12/2017 | George | G06F 3/067 |
| 2018/0220174 A1 | 8/2018 | Hunt | |
| 2019/0324644 A1* | 10/2019 | Jin | G06F 3/064 |

OTHER PUBLICATIONS

Written Opinion mailed Sep. 19, 2021 for International Application No. PCT/US2021/033857.

Search Strategy completed Sep. 19, 2021 for International Application No. PCT/US2021/033857.

U.S. Appl. No. 16/359,662, filed Mar. 20, 2019, entitled "Solid State Drive Latency Estimation Interface for Host Performance Tuning."

\* cited by examiner

STORAGE SYSTEM AND METHOD FOR STORAGE MANAGEMENT IN MULTI-CHANNEL, VARIABLE-BIT-RATE SYSTEMS

CROSS-REFERENCE TO RELATED APPLICATION

This application claims the benefit of U.S. provisional patent application No. 63/077,004, filed Sep. 11, 2020, which is hereby incorporated by reference.

BACKGROUND

A host computer can be connected to one or more video capture devices (e.g., cameras) and one or more storage systems to storing video data captured by the video capture device(s) in the memory of the storage system(s). The host can operate in a constant-bit-rate mode (which provides a fixed bit rate that can take up a lot of space in the memory) or a variable-bit-rate mode (which provides a varying bit rate that can take up less space in the memory).

DETAILED DESCRIPTION

Overview

Figure 1A:
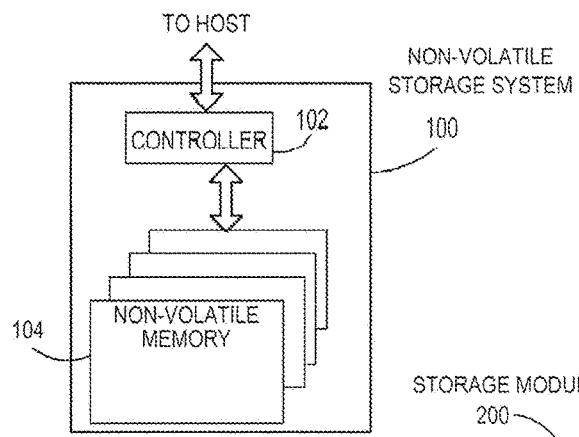
FIG. 1A is a block diagram of a non-volatile storage system of an embodiment.

By way of introduction, the below embodiments relate to a storage system and method for storage management in multi-channel, variable-bit-rate systems. In one embodiment, a host is provided comprising a first interface configured for communication with a storage system; a second interface configured for communication with a video capture device; and a processor. The processor is configured to receive an internal latency estimate from the storage system; use the internal latency estimate from the storage system to determine whether a rate of data generation by the video capture device exceeds a storage rate of the storage system; and in response to determining that the rate of data generation by the video capture device exceeds the storage rate of the storage system, instruct the video capture device to lower its rate of data generation.

In some embodiments, the processor is further configured to instruct the video capture device to lower its rate of data generation to a rate lower than a current rate but high enough to meet an acceptable minimum rate.

In some embodiments, the processor is further configured to determine whether the rate of data generation by the video capture device exceeds the storage rate of the storage system by evaluating a deviation of the storage rate of the storage system from an average storage rate of the storage system.

In some embodiments, the processor is further configured to: instruct the video capture device to lower its rate of data generation for a period of time; and after expiration of the period of time, instruct the video capture device to continue to lower its rate of data generation for another period of time in response to the rate of data generation by the video capture device being greater than the storage rate of the storage system.

In some embodiments, the second interface is further configured for communication with at least one additional video capture device, and the processor is further configured to instruct the video capture device and the at least one additional video capture device to lower their rates of data generation.

In some embodiments, the internal latency estimate from the storage system indicates a storage rate of the storage system.

In some embodiments, the storage system comprises a three-dimensional memory.

In another embodiment, a method is provided that is performed in a host in communication with a video capture device and a plurality of storage systems. The method comprises receiving respective storage rates from the plurality of storage systems; using the respective storage rates from the plurality of storage systems to determine which of the plurality of storage systems comprise a storage rate that is suitable for a data generation rate of the video capture device; and selecting the storage system comprising the storage rate that is suitable for the data generation rate of the video capture device to store data captured by the video capture device.

In some embodiments, the method further comprises maintaining a log of the respective storage rates received from the plurality of storage systems.

In some embodiments, the method further comprises using the respective storage rates from the plurality of storage systems to determine whether a data generation rate of the video capture device exceeds the respective storage rates of the plurality of storage system; and in response to determining that the data generation rate of the video capture device exceeds the respective storage rates of the plurality of storage systems, instructing the video capture device to lower its data generation rate.

In some embodiments, the method further comprises instructing the video capture device to lower its data generation rate to a rate lower than a current rate but high enough to meet an acceptable minimum rate.

In some embodiments, the method further comprises determining whether the data generation rate of the video capture device exceeds the respective storage rates of the plurality of storage systems by evaluating a deviation of the respective storage rates of the plurality of storage systems from an average storage rate of the plurality of storage systems.

In some embodiments, the method further comprises instructing the video capture device to lower its data generation rate for a period of time; and after expiration of the period of time, instructing the video capture device to continue to lower its data generation rate for another period of time in response to the data generation rate by the video capture device being greater than the respective storage rates of the plurality of storage systems.

In some embodiments, the host is in communication with at least one additional video capture device, and the method further comprises instructing the video capture device and the at least one additional video capture device to lower their data generation rates.

In some embodiments, at least one of the plurality of the storage systems comprises a three-dimensional memory.

In another embodiment, a host is provided comprising: a first interface configured for communication with a storage system; a second interface configured for communication with a video capture device; means for receiving a latency estimate from the storage system; means for using the latency estimate from the storage system to determine whether a rate of data generation by the video capture device exceeds a storage rate of the storage system by more than a threshold; and means for, in response to determining that the rate of data generation by the video capture device exceeds the storage rate of the storage system by more than the threshold, instructing the video capture device to lower its rate of data generation.

In some embodiments, the internal latency estimate from the storage system indicates a storage rate of the storage system.

In some embodiments, the means for receiving, means for using, and means for instructing are implemented in a processor in the host.

In some embodiments, the first interface is further configured for communication with at least one additional storage system.

In some embodiments, the second interface is further configured for communication with at least one additional video capture device.

Other embodiments are possible, and each of the embodiments can be used alone or together in combination. Accordingly, various embodiments will now be described with reference to the attached drawings.

Embodiments

Figure 1B:
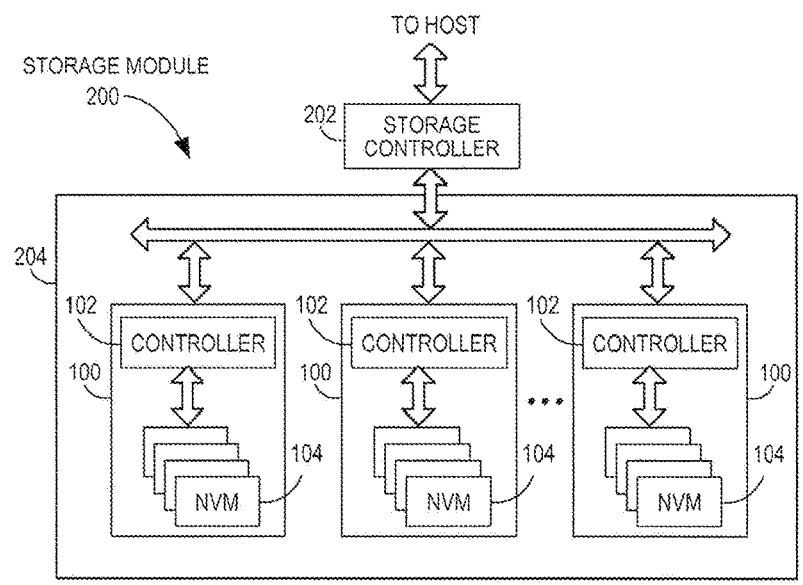
FIG. 1B is a block diagram illustrating a storage module of an embodiment.
Figure 1C:
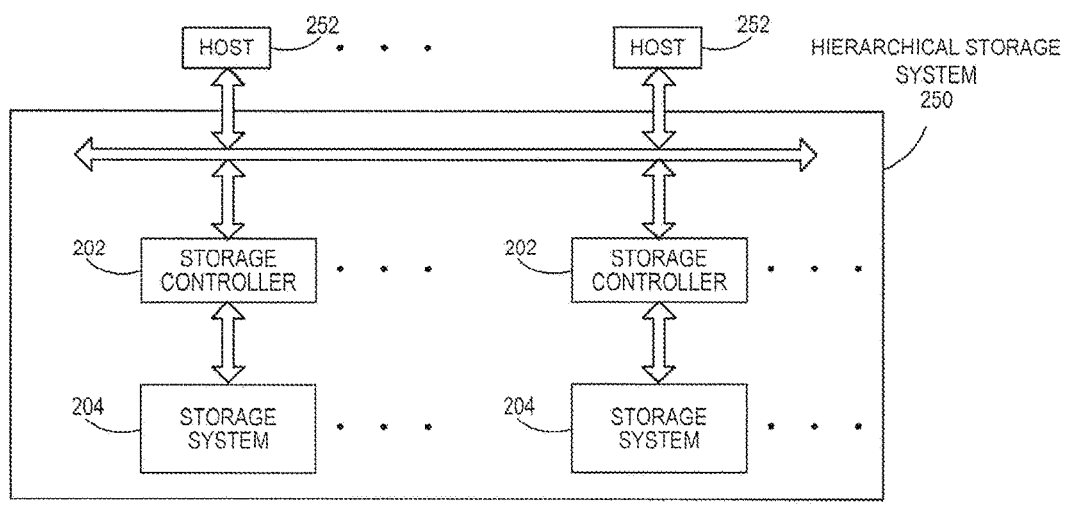
FIG. 1C is a block diagram illustrating a hierarchical storage system of an embodiment.

Storage systems suitable for use in implementing aspects of these embodiments are shown in FIGS. 1A-1C. FIG. 1A is a block diagram illustrating a non-volatile storage system 100 according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
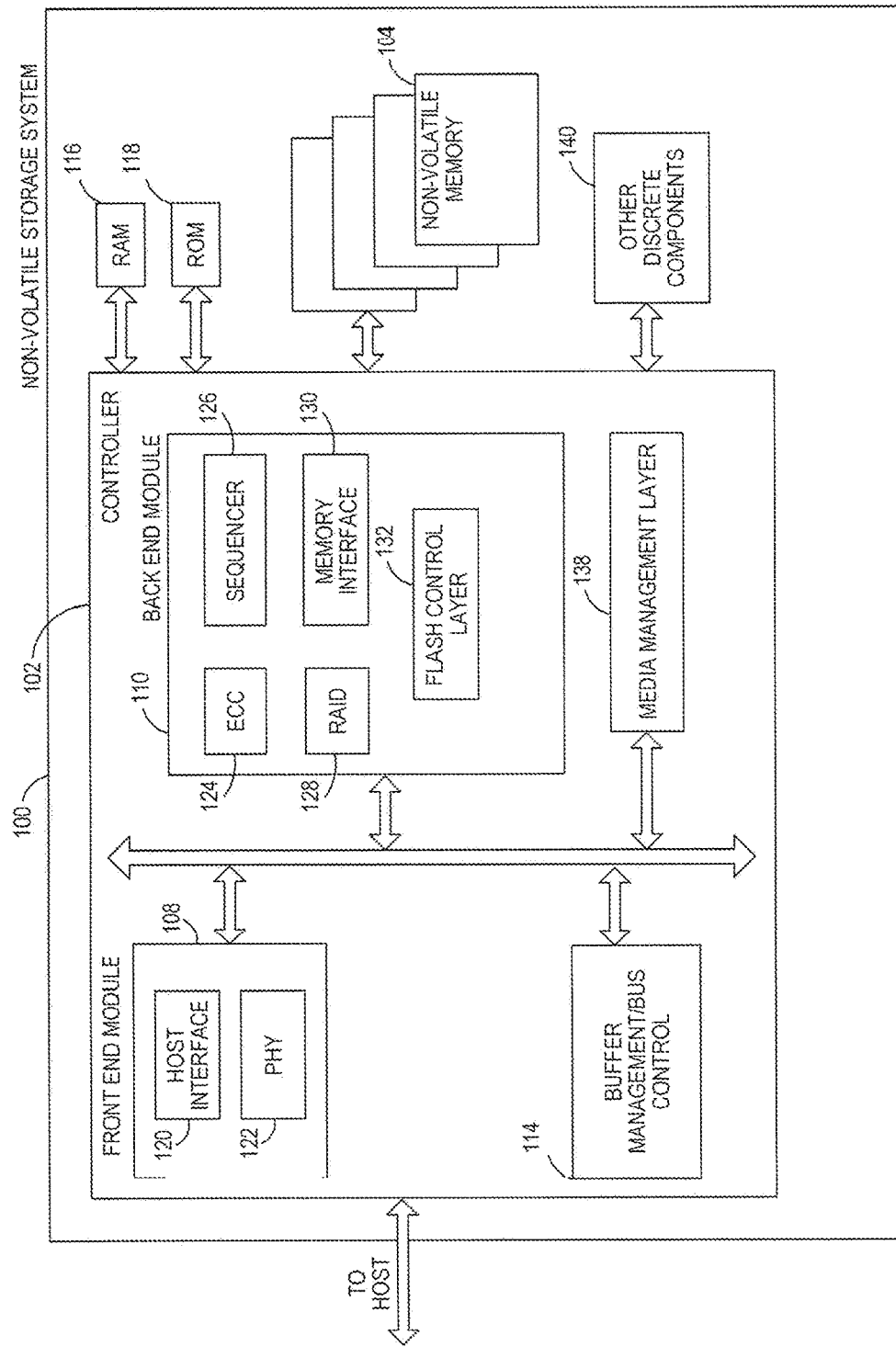
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
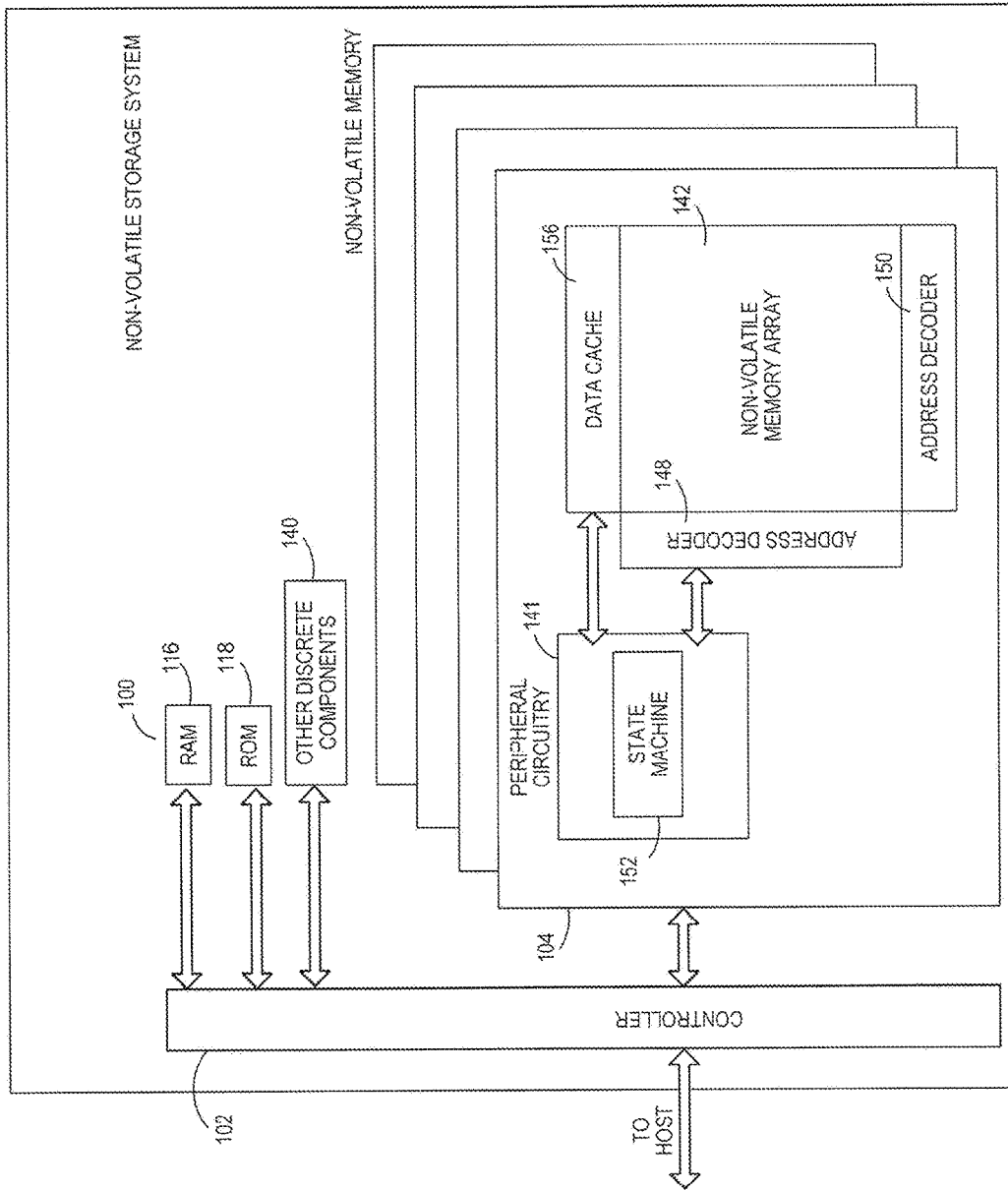
FIG. 2B is a block diagram illustrating components of the non-volatile memory storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
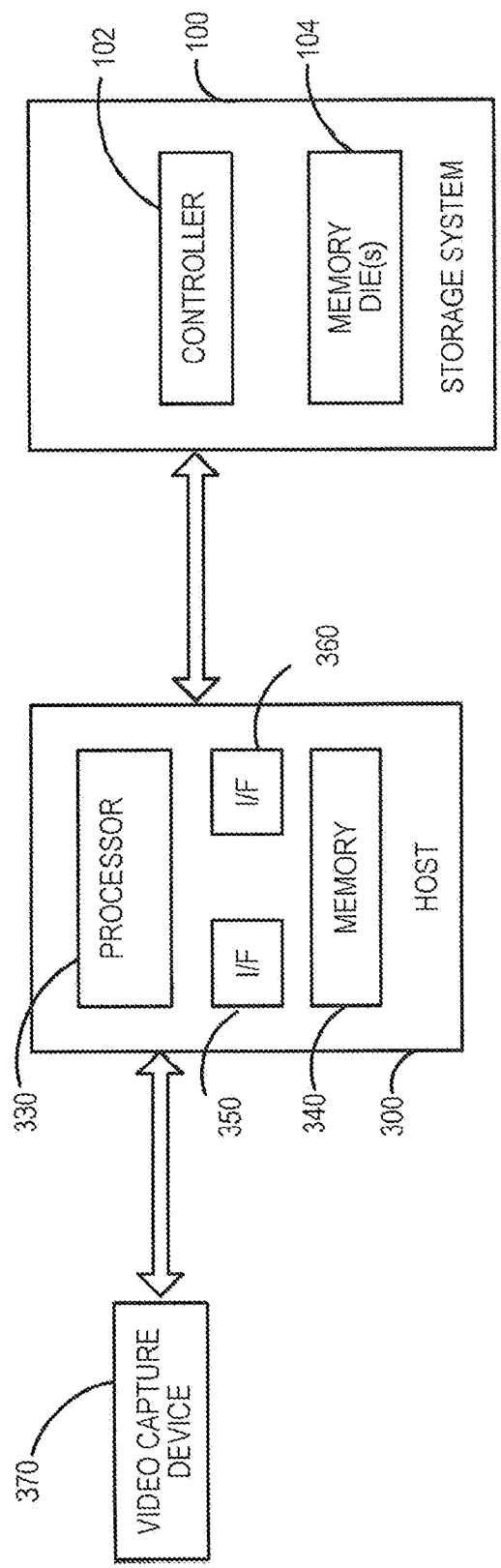
FIG. 3 is a block diagram of a host and storage system of an embodiment.

Turning again to the drawings, FIG. 3 is a block diagram of a host 300 and storage system 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to perform the acts described herein. So, actions performed by the host 300 are sometimes referred to herein as being performed by an application (computer-readable program code) run on the host 300.

Figure 4:
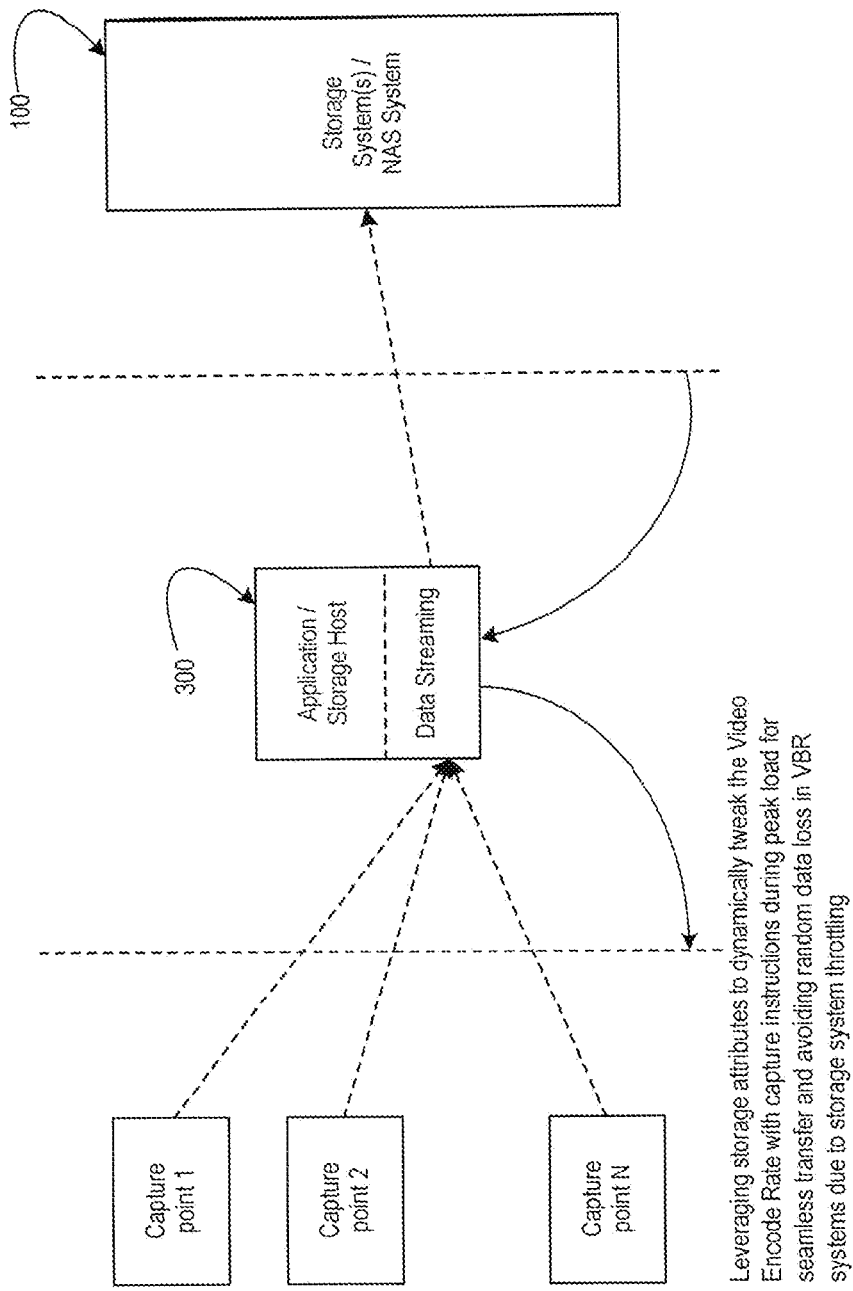
FIG. 4 is a block diagram of a system of an embodiment.

FIG. 3 also shows that the host 300 comprises a first interface 360 for communication with the storage system 100 and a second interface 350 for communication with a video capture device (e.g., a camera) 370. Any suitable types of interfaces 360, 370 can be used. Also, while FIG. 3 shows a single storage system 100 and a single video capture device 370 connected to the host 300, multiple storage systems and/or multiple video capture devices can be used. For example, in the embodiment shown in FIG. 4, N number of video capture devices (referred to therein as "capture points") can be used with one or more storage system(s) 100. Further, as indicated in FIG. 4, the video capture device(s) and/or storage system(s) can be in communication with the host 300 via a network (hence, the storage system(s) in FIG. 4 may sometimes be referred to herein as network attached storage (NAS) systems).

In general, there are two types of data rates in live capture by the video capture device 730: constant bit rate (CBR) and variable bit rate (VBR). The major problem with CBR is that there is continuous data capture at a fixed rate even where there is not any motion during capture. Although CBR encoding is simpler than VBR encoding, many surveillance vendors move away from CBR due to poorer storage return on investment. On the other hand, while VBR can provide superior storage return on investment, peek data rate with a VBR multi-channel system can throttle the entire system. This is referred to as the peak load management problem. In a typical system, both the network and the storage rates are designed for an average to above-average usage with sufficient margins. Other systems may assume that not all the capture points are going to have concurrent incidences above a threshold over a period. These systems work well when the assumptions are true. However, peak data generation where all capture points generate maximum data rates may throttle the system. Typical systems also need enormous storage performance margins to handle peak loads with VBR. Throttling multi-channel live data can result in random behavior and loss of data if the storage does not consume data within a stipulated time.

Figure 5:
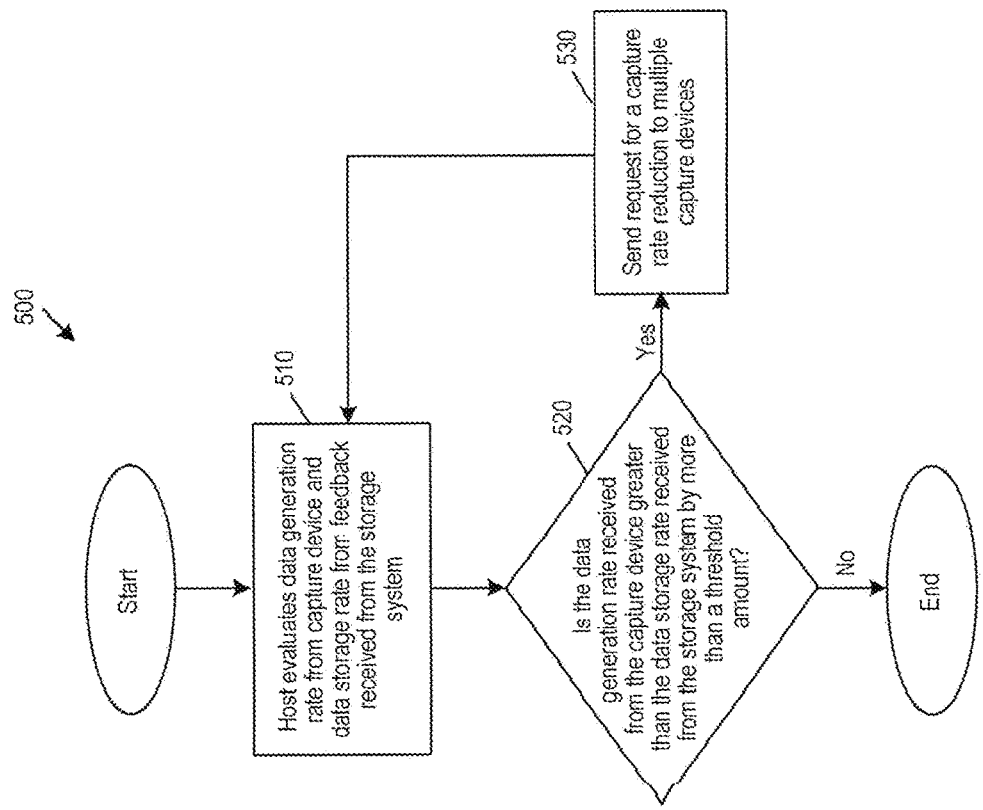
FIG. 5 is a flow chart of a method of an embodiment for storage management in multi-channel, variable-bit-rate systems.

To address these issues, the following embodiments provide a method for storage management in multi-channel, variable-bit-rate systems. FIG. 5 is a flow chart 500 of an example method of an embodiment. As shown in FIG. 5, the host 300 evaluates a data generation rate from the video capture device 370 and a data storage rate from feedback received from the storage system 100 (act 510). (As used herein, "data storage rate" refers to the storage processing capability of the storage system 100). The data generation rate can be provided by the video capture device 370 (e.g., in response to a request from the host 300), or the host 300 can calculate the data generation rate based on a stream of data received from the video capture device 370.

The data storage rate can be provided by the storage system 100 in any suitable way. In general, the storage system 100 takes a certain amount of time to execute write and read commands ("latency"). Any suitable latency estimate technique can be used. For example, one latency estimate technique determines an average latency over a number of commands to determine a current latency estimate. Another latency estimate technique is described in U.S. patent application Ser. No. 16/359,662, filed Mar. 20, 2019, which is hereby incorporated by reference. That technique uses information regarding a specific operation for a current command and a current operational state of the storage system 100 to determine the latency estimate, which results in predictions that are more accurate. In one embodiment described in the '662 application, a storage system receives, from a host device, a command regarding a group of files, wherein execution of the command by the storage system involves a file system update; and reporting, from the storage system to the host device, prior to completion of the command by the storage system, a latency estimate comprising: a block erase time estimate; a swap time estimate for cached flash translation layer pages; a garbage collection time estimate; and a random access latency estimate for the group of files based on a number of random memory accesses needed to perform the file system update.

Returning to FIG. 5, next, the processor 330 in the host 300 determines if the data generation rate received from the video capture device 370 is greater that the data storage rate received from the storage system 100 (e.g., by more than a threshold) (act 520). If it is, the host 300 sends a request for a capture rate reduction to the video capture device 370 (act 530). For example, the host 300 can evaluate the deviation of the storage system's present data generation rate from average and instruct the video capture device 370 to lower its video encode rate (to a lower level but above a minimum amount). When multiple video capture devices are used, the host 300 can also ensure that the total of the bit rates is less than the evaluated storage-streaming rate. For example, a four megabit-per-second encode rate can be lowered to a three megabit-per-second encode rate without much loss in quality of service at the capture points, but lowering a one megabit-per-second encode rate to a 500 kilobit-per-second encode rate might result in an unacceptable loss in quality.

When the system contains a plurality of storage systems, the host 300 can use the respective storage rates of the plurality of storage systems to evaluate the total storage processing rate capability for a period. (The host can maintain a log of the various data storage rates). On determining that the rate of data generation by the video capture device 370 is more than the overall storage rate, the host 300 can instruct the video capture device 370 to encode video at a lower rate (e.g., but higher than an acceptable minimum rate to provide a minimum quality of service) for a period of time to minimize peak storage loads in the system.

When the system contains a plurality of video capture devices forming a multi-channel VBR system (see FIG. 4), the host 300 can proactively lower the encode rate in the various capture points (e.g., according to the acceptable minimum bit rate) to avoid random loss of live data due to storage/network throttling. Additionally, such a system also eases the storage and network margins kept during the design phase.

There are several advantages provided by managing encode rates in capture devices based on storage attributes. While quality of service may be reduced at the capture points with this embodiment, it is reduced in a controlled manner. This provides an advantage over uncontrolled throttling (e.g., with the network or storage system 100 struggling to manage enormous amounts of live data), which can potentially lead to unwarranted data loss. Having the host 300 use storage hints to tweak the encoding rates of one or many capture points to make sure the data movement is seamless throughout the system minimizes peak workloads. That may provide particular benefit in surveillance systems, as well as automotive applications where multiple sensors can stream multiple data to the storage system(s).

The reduction in the video capture device's data generation rate can be temporary. For example, the host 300 can instruct the video capture device 370 to lower its data generation rate for a period of time. After the period of time has expired, the video capture device 370 can automatically resume its prior data generation rate (or some other higher data generation rate). Also, the host 300 can re-check to see it should instruct the video capture device 370 to lower its data generation rate for another period of time. To address the other side of the spectrum, the video capture points can go above the typically-set bit rates when needed to leverage a better condition in the network or storage system. Further, the host 300 can be configured to receive a latency estimate from the storage system 100, use the latency estimate from the storage system 100 to determine whether a rate of data generation by the video capture device 370 is much smaller than a storage rate of the storage system 100 (e.g., by a threshold), and in response to determining that the rate of data generation by the video capture device 370 is much smaller than the storage rate of the storage system 100 (e.g., by the threshold), instruct the video capture device 370 of the available bit rate margin, in case of bump-up requirements on the capture side.

Many alternatives can be used with these embodiments. In one alternative where a plurality of storage systems are used, the host 300 can determine which storage system(s) have a storage rate that is suitable for a data generation rate of the video capture device 370 and select such storage system(s) to store data captured by the video capture device 370. Being able to dynamically choose storage system(s) among a pool of multiple storage system options allows the host 300 to switch from one storage system to another for a period of time after determining the ability of the storage system in the context of the data generated by the application.

Consider, for example, an ecosystem in which three storage systems are associated at the backend for recording purposes but are all in different firmware states. By being able to hint at those states to the host 300, the storage systems enable the host 300 to understand the latency to handle a command. With the host 300 knowing the storage-processing rate, the host 300 can dynamically use different ones of the available storage systems at its discretion based on data rate matches.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two-dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two-dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A method comprising:
  performing in a host in communication with a storage system and a plurality of video capture devices:
    sending to the storage system, a command regarding a group of files, wherein execution of the command by the storage system involves a file system update; and
    receiving, prior to completion of the command by the storage system, an internal latency time estimate from the storage system, wherein the internal latency time estimate comprises: a block erase time estimate; a swap time estimate for cached flash translation layer pages; a garbage collection time estimate; and a random access latency estimate for the group of files based on a number of random memory accesses needed to perform the file system update;
    using the internal latency time estimate from the storage system to evaluate a total storage processing rate capability for a first period of time;
    determining whether a collective rate of data generation by the plurality of video capture devices exceeds the total storage processing rate capability for the first period of time;
    in response to determining that the collective rate of data generation by the plurality of video capture devices exceeds the total storage processing rate capability for the first period of time, instructing each video capture device of a subset of the plurality of video capture devices to lower its rate of data generation to a rate lower than a current rate but higher than a zero rate, and high enough to meet an acceptable minimum rate to provide a minimum quality of service, to minimize a peak storage load for a second period of time, wherein the rate of data generation comprises a rate of capturing video.

2. The method of claim 1, wherein:
  determining whether the collective rate of data generation by the plurality of video capture devices exceeds a storage rate of the storage system comprises evaluating a deviation of the storage rate of the storage system from an average storage rate of the storage system.

3. The method of claim 1, wherein:
  instructing each video capture device of the subset of the plurality of video capture devices to lower its rate of data generation comprises instructing each video capture device to lower its rate of data generation for the second period of time.

4. The method of claim 1, wherein the host comprises an interface configured for communication with the plurality of video capture devices.

5. The method of claim 1, wherein the internal latency time estimate from the storage system indicates a storage rate of the storage system.

6. The method of claim 1, wherein the storage system comprises a three-dimensional memory.

7. The method of claim 1, wherein the plurality of video capture devices is part of a surveillance system.

8. The method of claim 1, further comprising:
  receiving an updated latency time estimate from the storage system;
  using the updated latency time estimate to determine whether a current collective rate of data generation by the plurality of video capture devices is lower than a current storage rate of the storage system by a threshold; and
  in response to determining that the current collective rate of data generation by the plurality of video capture devices is lower than the current storage rate of the storage system by the threshold, instructing each video capture device of the subset of the plurality of video capture devices to increase its rate of data generation.

9. A host comprising:
  interfaces configured for communication with a storage system and a plurality of video capture devices; and
  a processor configured to:
    send to the storage system, a command regarding a group of files, wherein execution of the command by the storage system involves a file system update;

receive, prior to completion of the command by the storage system, an internal latency time estimate from the storage system, wherein the internal latency time estimate comprises: a block erase time estimate; a swap time estimate for cached flash translation layer pages; a garbage collection time estimate; and a random access latency estimate for the group of files based on a number of random memory accesses needed to perform the file system update;

use the internal latency time estimate from the storage system to evaluate a total storage processing rate capability for a first period of time;

determine whether a collective rate of data generation by the plurality of video capture devices exceeds the total storage processing rate capability for the first period of time; and in response to determining that the collective rate of data generation by the plurality of video capture devices exceeds the total storage processing rate capability for the first period of time, instruct each video capture device of a subset of the plurality of video capture devices to lower its rate of data generation to a rate lower than a current rate but higher than a zero rate, and high enough to meet an acceptable minimum rate to provide a minimum quality of service, to minimize a peak storage load for a second period of time, wherein the rate of data generation comprises a rate of capturing video.

10. The host of claim 9, wherein determining whether the collective rate of data generation by the plurality of video capture devices exceeds a storage rate of the storage system comprises evaluating a deviation of the storage rate of the storage system from an average storage rate of the storage system.

11. The host of claim 9, wherein instructing each video capture device of the subset of the plurality of video capture devices to lower its rate of data generation comprises instructing each video capture device to lower its rate of data generation for the second period of time.

12. The host of claim 9, wherein the internal latency time estimate from the storage system indicates a storage rate of the storage system.

13. The host of claim 9, wherein the plurality of video capture devices is part of a surveillance system.

14. The host of claim 9, wherein the processor is further configured to:

receive an updated latency time estimate from the storage system;

use the updated latency time estimate to determine whether a current collective rate of data generation by the plurality of video capture devices is lower than a current storage rate of the storage system by a threshold; and in response to determining that the current collective rate of data generation by the plurality of video capture devices is lower than the current storage rate of the storage system by the threshold, instruct each video capture device of the subset of the plurality of video capture devices to increase its rate of data generation.

15. A host comprising:

interfaces configured for communication with a storage system and a plurality of video capture devices; and means for:

sending to the storage system, a command regarding a group of files, wherein execution of the command by the storage system involves a file system update;

receiving, prior to completion of the command by the storage system, an internal latency time estimate from the storage system, wherein the internal latency time estimate comprises: a block erase time estimate; a swap time estimate for cached flash translation layer pages; a garbage collection time estimate; and a random access latency estimate for the group of files based on a number of random memory accesses needed to perform the file system update;

using the internal latency time estimate from the storage system to evaluate a total storage processing rate capability for a first period of time;

determining whether a collective rate of data generation by the plurality of video capture devices exceeds the total storage processing rate capability for the first period of time; and in response to determining that the collective rate of data generation by the plurality of video capture devices exceeds the total storage processing rate capability for the first period of time, instructing each video capture device of a subset of the plurality of video capture devices to lower its rate of data generation to a rate lower than a current rate but higher than a zero rate, and high enough to meet an acceptable minimum rate to provide a minimum quality of service, to minimize a peak storage load for a second period of time, wherein the rate of data generation comprises a rate of capturing video.

16. The host of claim 15, wherein determining whether the collective rate of data generation by the plurality of video capture devices exceeds a storage rate of the storage system comprises evaluating a deviation of the storage rate of the storage system from an average storage rate of the storage system.

17. The host of claim 15, wherein instructing each video capture device of the subset of the plurality of video capture devices to lower its rate of data generation comprises instructing each video capture device to lower its rate of data generation for the second period of time.

18. The host of claim 15, wherein the internal latency time estimate from the storage system indicates a storage rate of the storage system.

19. The host of claim 15, wherein the plurality of video capture devices is part of a surveillance system.

20. The host of claim 15, further comprising:

means for receiving an updated latency time estimate from the storage system;

means for using the updated latency time estimate to determine whether a current collective rate of data generation by the plurality of video capture devices is lower than a current storage rate of the storage system by a threshold; and means for instructing each video capture device of the subset of the plurality of video capture devices to increase its rate of data generation in response to determining that the current collective rate of data generation by the plurality of video capture devices is lower than the current storage rate of the storage system by the threshold.

* * * * *